United States Patent Office 3,746,705
Patented July 17, 1973

3,746,705
AMINOIMIDAZOLE DERIVATIVES
Bruno Cavalleri, Milan, and Giancarlo Lancini, Pavia, Italy, assignors to Gruppo Lepetit S.p.A., Milan, Italy
No Drawing. Filed Nov. 17, 1971, Ser. No. 199,728
Claims priority, application Italy, Nov. 20, 1970, 31,972/70
Int. Cl. C07d 49/36, 63/12
U.S. Cl. 260—240 A    10 Claims

ABSTRACT OF THE DISCLOSURE

Imidazole derivatives corresponding to the formula

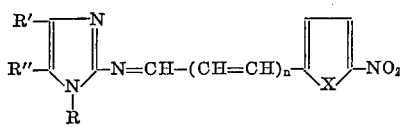

and their mineral acid salts wherein R represents hydrogen, lower alkyl, lower hydroxyalkyl, or lower halogenoalkyl; R' represents hydrogen or phenyl; R'' represents hydrogen, lower alkyl, lower hydroxyalkyl, lower halogenoalkyl or phenyl; X represents O or S; and n is 0 or 1 are claimed. They are prepared by reacting (1) a corresponding aminoimidazole with (2) a nitrofurancarboxaldehyde, a nitrothiophenecarboxaldehyde or their vinylogs. The novel compounds have antimicrobial activity.

SUMMARY OF THE INVENTION

This invention is concerned with Schiff bases of 2-aminoimidazoles corresponding to the formula

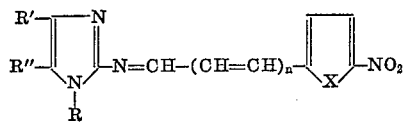

and their mineral acid salts wherein R represents hydrogen, lower alkyl, lower hydroxyalkyl or lower halogenoalkyl; R' represents hydrogen or phenyl; R'' represents hydrogen, lower alkyl, lower hydroxyalkyl, lower halogenoalkyl or phenyl; X represents O or S; and n is 0 or 1.

As used in the specification and claims the terms "lower alkyl" and "lower hydroxyalkyl" designate alkyl and hydroxyalkyl groups having from 1 to 4 carbon atoms, such as, for example, a methyl, an ethyl, a propyl or a butyl; and a hydroxymethyl, a hydroxyethyl, a hydroxypropyl or a hydroxybutyl group, respectively. The term "lower halogenoalkyl" refers to lower alkyl groups having chloro or bromo substitution.

The compounds of this invention show antimicrobial activity against many micro-organisms, such as, for example, Proteus vulgaris, Escherichia coli, Staphylococcus aureus, and Clostridium perfringens. For example, in representative tests it has been found that the compounds herein described and claimed inhibit in vitro the growth of the named species of microorganisms at concentrations ranging between 0.5 to 5 γ/ml. of nutrient medium. This antimicrobial activity is coupled with a low toxicity which, in general, ranges from an $LD_{50}$ of about 1000 to about 2000 mg./kg. per os in mice. It is not to be inferred that the compounds of this invention all have the same activity against all such micro-organisms or are equally active at the same concentration.

DETAILED DESCRIPTION OF THE INVENTION

The process for the preparation of the new compounds comprises reacting (1) an aminoimidazole with (2) a nitrofurancarboxaldehyde or with a nitrothiophenecarboxaldehyde or with one of their vinylogs according to the following schematic equation wherein substituent groups are as defined above:

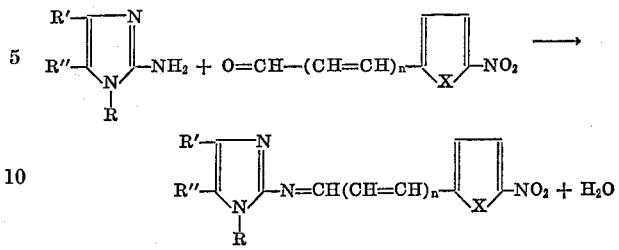

While proportions of the reactants to be employed are not critical, it is preferred to employ about one molecular proportion of aldehyde to about one molecular proportion of aminoimidazole. In making the compounds, aminoimidazole hydrochloride or hydrobromide is added with stirring to a solution of a substantially equimolar amount of one of the said aldehydes in a solvent, conveniently one of the lower alkanols or mixtures of lower alkanols. When the solid is dissolved, the mixture is cooled to about 0° C. and a substantially equivalent amount of a strong base such as an alkali metal oxide or an alkali metal hydroxide or triethylamine dissolved in a lower alkanol is slowly added. After standing for a period of time from 12 to 36 hours at a temperature between about 0° C. and about 10° C., the precipitate is collected. By concentration of the filtrate to a small volume, an additional crop of product can be obtained. The crude product is recrystallized from an organic solvent such as, for example, ethyl acetate or washed with water until the washings are free of chloride and dried in vacuo to give the pure compound.

The pure compound, as free base, is converted to its mineral acid salt by dissolving it in a suitable solvent, conveniently acetone, and adding to the resulting solution a solution in ethyl ether (or equivalent inert solvent) of hydrogen chloride, hydrogen bromide or equivalent acid in amount in small molar excess. The mineral acid salt of the free base crystallizes out and is recovered from the reaction medium by concentration of the latter under reduced pressure.

The following compounds are representative embodiments of this invention:

2-(5-nirto-2-furfurylideneamino)imidazole
2-(5-nitro-2-furfurylideneamino)-5-phenylimidazole
1,5-dimethyl-2-(5-nitro-2-furfurylideneamino)imidazole
1-methyl-2-(5-nitro-2-furfurylideneamino)-5-isopropylimidazole
1-methyl-2-(5-nitro-2-furfurylideneamino)-5-(2-hydroxyethyl)imidazole
1-(2-hydroxyethyl)-2-(5-nitro-2-furfurylideneamino)-5-methylimidazole
1-(2-hydroxyethyl)-2-(5-nitro-2-furfurylideneamino)-5-ethylimidazole hydrochloride
1-(2-chloroethyl)-2-(5-nitrofurfurylideneamino)-5-ethylimidazole
1-(2-bromoethyl)-2-(5-nitrofurfurylideneamino)-5-ethylimidazole
1-methyl-2-(5-nitro-2-furfurylideneamino)-4-phenylimidazole
1-(2-hydroxyethyl)-2-furfurylideneamino-5-ethylimidazole
2-(5-nitro-2-thenylideneamino)imidazole
2-(5-nitro-2-thenylideneamino)-5-phenylimidazole
1,5-dimethyl-2-(5-nitro-2-thenylideneamino)imidazole
1-methyl-2-(5-nitro-2-thenylideneamino)-5-isopropylimidazole
1-methyl-2-(5-nitro-2-thenylideneamino)-5-(2-hydroxyethyl)imidazole 1-(2-hydroxyethyl)-2-(5-nitro-2-thenylideneamino)-5-methylimidazole
1-(2-hydroxyethyl)-2-(5-nitro-2-thenylideneamino)-5-ethylimidazole
1-(2-hydroxyethyl)-2-(5-nitro-2-thenylideneamino)-5-propylimidazole
1-(2-chloroethyl)-2-(5-nitro-2-thenylideneamino)-5-ethylimidazole
1-methyl-2-(5-nitro-2-thenylideneamino)-4-phenylimidazole
1-(2-hydroxyethyl)-2-[3-(5-nitro-2-thienyl)-2-propenylideneamino]-5-ethylimidazole
1,5-dimethyl-2-[3-(5-nitro-2-furyl)-2-propenylideneamino]imidazole
1-(2-hydroxyethyl)-2-[3-(5-nitro-2-furyl)-2-propenylideneamino]-5-ethylimidazole
1-(4-hydroxybutyl)-2-[3-(5-nitro-2-furyl)-2-propenylideneamino]-5-ethylimidazole
1-methyl-2-[3-(5-nitro-2-furyl)-2-propenylideneamino]-5-(2-hydroxyethyl)imidazole
1-methyl-2-[3-(5-nitro-2-thienyl)-2-propenylideneamino]-5-ethylimidazole
1-(2-hydroxyethyl)-2-[3-(5-nitro-2-furyl)-2-propenylideneamino]-5-methylimidazole
1-methyl-2-[3-(5-nitro-2-thienyl)-2-propenylideneamino]-5-(2-hydroxyethyl)imidazole
1-(2-chloroethyl)-2-[3-(5-nitro-2-furyl)-2-propylideneamino]-5-ethylimidazole
2-[3-(5-nitro-2-thienyl)-2-propenylideneamino]-5-phenylimidazole The compounds of the invention are solids having a varying degree of solubility in a number of organic liquids usually employed as solvents. They are in general fairly soluble in lower alkanols, ethylene glycol and dimethylformamide. Their solubility in water as free bases is generally poor, being improved in the form of their mineral acid salts.

The compounds of the invention have good antimicrobial activity. In particular, most of them are quite active against anaerobic bacilli such as those belonging to the genus Clostridium. Amounts of about one γ/ml. of nutrient medium of most compounds were found to inhibit the growth of these anaerobic bacteria which may cause severe forms of infection such as gas gangrene or intestinal diseases such as enteritis necroticans.

The compounds of the invention may be used as antimicrobial agents in the usual dosage forms. When an oral administration route is preferred, the compounds are embodied in dosage forms such as, for example, tablets, capsules, elixirs. The dosage unit may contain usual excipients such as, for example, starch, gums, alcohols, sugars, fatty acids, etc. The compounds may also be administered parenterally in the form of an aqueous solution admixed with other usual ingredients such as, for example, antioxidants, preservatives, chelating and buffering agents. The compounds may also be employed for topical application in combinations, for example, with one or more of petrolatum, liquid petrolatum, beeswax, spermaceti, water, silicones, fatty acids, alcohols, etc. as bases for lotions and ointments according to usual preparative practices.

The following examples describe representative specific embodiments of the manner and process of making and using the invention and the best mode contemplated by the inventors of carrying out their invention.

EXAMPLES 1–22

A quantity of one gram of a 2-aminoimidazole, as indicated in following Table I, is added in the form of its hydrochloride or hydrobromide with stirring to a solution of an equimolar amount of an aldehyde, as indicated in the following table, in a mixture of ethanol (50 ml.) and methanol (25 ml.). When the solid is dissolved, the mixture is cooled to 0° C. and an equivalent amount of sodium ethoxide in ethanol (10 ml.) is slowly added. After standing for 12–36 hours at 0° C. to 10° C., the precipitate which forms is collected. By concentrating the filtrate, an additional crop of product can be obtained. The crude product is recrystallized from ethyl acetate or washed with water until the washings are free of chloride or bromide and dried in vacuo to give pure product. The free base dissolved in acetone is reacted with an ethyl ether solution saturated with hydrogen chloride to give the hydrochloride salt. The salt crystallizes out and is recovered from the reaction medium by concentration of the latter under reduced pressure.

TABLE I

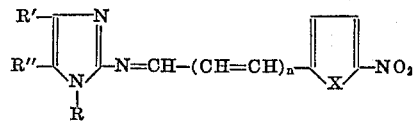

| Compound of Ex.— | R | R' | R" | n | X | Melting point, °C. | Yield, percent | Calculated C | Calculated H | Calculated N | Found C | Found H | Found N |
|---|---|---|---|---|---|---|---|---|---|---|---|---|---|
| 1 | H | H | H | 0 | O | [1] 230 | 6.9 | 46.61 | 2.93 | 27.18 | 46.75 | 3.10 | 27.13 |
| 2 | H | H | C₆H₅ | 0 | O | 210–1 | 34.7 | 59.57 | 3.57 | 19.85 | 59.80 | 3.67 | 19.78 |
| 3 | CH₃ | H | CH₃ | 0 | O | 176–80 | 75.7 | 51.28 | 4.30 | 23.92 | 51.56 | 4.40 | 24.20 |
| 4 | CH₃ | H | i.C₃H₇ | 0 | O | 199–200 | 73.8 | 54.96 | 5.38 | 21.36 | 54.54 | 5.56 | 21.25 |
| 5 | CH₃ | H | CH₂CH₂OH | 0 | O | 198–201 | 30.2 | 50.00 | 4.58 | 21.20 | 50.15 | 4.70 | 21.12 |
| 6 | CH₂CH₂OH | H | CH₃ | 0 | O | [1] 166–8 | 67.3 | 50.00 | 4.58 | 21.20 | 50.10 | 4.46 | 20.81 |
| 7 [2] | CH₂CH₂OH | H | C₂H₅ | 0 | O | 146–8 | 57.5 | 51.80 | 5.07 | 20.13 | 51.67 | 5.17 | 19.99 |
| 8 | CH₂CH₂Cl | H | C₂H₅ | 0 | O | 152.4 | 56.9 | 48.57 | 4.41 | 18.88 | 48.63 | 4.60 | 19.00 |
| 9 | CH₃ | C₆H₅ | H | 0 | O | 230–2 | 77.7 | 60.81 | 4.08 | 18.91 | 60.89 | 3.96 | 19.08 |
| 10 | H | H | H | 0 | S | 192 | 26.6 | 43.23 | 2.72 | 25.51 | 43.36 | 2.90 | 25.13 |
| 11 | H | H | C₆H₅ | 0 | S | 213–5 | 44.6 | 56.36 | 3.37 | 18.78 | 56.54 | 3.35 | 18.55 |
| 12 [3] | CH₃ | H | CH₃ | 0 | S | 252–4 | 82.4 | 48.00 | 4.02 | 22.39 | 48.29 | 4.15 | 22.67 |
| 13 | CH₃ | H | i.C₃H₇ | 0 | S | 219–20 | 76 | 51.78 | 5.06 | 20.13 | 51.31 | 5.35 | 20.06 |
| 14 | CH₃ | H | CH₂CH₂OH | 0 | S | 214–5 | 69.6 | 47.13 | 4.31 | 19.98 | 47.06 | 4.35 | 20.16 |
| 15 | CH₂CH₂OH | H | CH₃ | 0 | S | 225 | 33.8 | 47.13 | 4.31 | 19.98 | 47.05 | 4.63 | 19.76 |
| 16 [4] | CH₂CH₂OH | H | C₂H₅ | 0 | S | 175–7 | 71.8 | 48.96 | 4.79 | 19.03 | 49.02 | 4.90 | 18.92 |
| 17 | CH₂CH₂OH | H | n.C₃H₇ | 0 | S | 146–8 | 53.5 | 50.63 | 5.22 | 18.17 | 51.13 | 5.38 | 17.95 |
| 18 | CH₂CH₂Cl | H | C₂H₅ | 0 | S | 149–51 | 20.2 | 46.08 | 4.18 | 17.91 | 46.00 | 4.30 | 17.76 |
| 19 | CH₃ | C₆H₅ | H | 0 | S | 193–5 | 87 | 57.68 | 3.87 | 17.93 | 57.80 | 4.00 | 17.68 |
| 20 | CH₂CH₂OH | H | C₂H₅ | 1 | S | 186–90 | 24 | 52.48 | 5.03 | 17.48 | 52.10 | 5.10 | 17.16 |
| 21 | C₂H₅ | H | CH₂CH₂Cl | 0 | S | 150–2 | 84 | 46.08 | 4.18 | 17.91 | 45.90 | 4.02 | 17.70 |
| 22 | n.C₃H₇ | H | CH₂CH₂Cl | 0 | O | 110–2 | 73.5 | 50.24 | 4.86 | 18.03 | 50.32 | 4.91 | 17.83 |

[1] Recrystallization solvent: ethyl acetate.
[2] The hydrochloride of Compound 7 melts at 170°–174° C.
[3] The hydrochloride of Compound 12 melts at 230°–232° C.
[4] The hydrochloride of Compound 16 melts at 197°–201° C.

The 2-aminoimidazole starting materials are prepared according to conventional methods described in the chemical literature. The aldehyde starting materials are commercially available products or are obtained by conventional methods.

The following Table II illustrates in vitro activity of representative compounds of this invention at indicated concentrations against various organisms in appropriate culture media. The incubation period for gram-positive and gram-negative bacteria varied from 18 to 48 hours at 37° C. according to the strains; for *M. tuberculosis*, the incubation period was 7 days at 37° C. Fungi were incubated for 48 hours at 30° C. The lowest concentration of the compound that prevented any visible growth was taken as the minimum inhibitory concentration, MIC.

4. A compound as defined in claim 1 which is 1-(2-hydroxyethyl) - 2 - (5-nitro-2-furfurylideneamino)-5-ethylimidazole.

5. A compound as defined in claim 1 which is 1-(2-chloroethyl) - 2 - (5 - nitro-2-furfurylideneamino)-5-ethylimidazole.

6. A compound as defined in claim 1 which is 2-(5-nitro-2-thenylideneamino)imidazole.

7. A compound as defined in claim 1 which is 2-(5-nitro-2-thenylideneamino)-5-phenylimidazole.

8. A compound as defined in claim 1 which is 1-methyl-2 - (5 - nitro - 2 - thenylideneamino)-5-(2-hydroxyethyl)-imidazole.

TABLE II

| Compound of Ex.— | C.p. | S.a. | St.h. | St.f. | D.pn. | P.v. | E.c. | S.ty. | Sh.S. | K.p. | K.p.I. | Ps.a. | C.a. | T.m. | My.t. | T.v |
|---|---|---|---|---|---|---|---|---|---|---|---|---|---|---|---|---|
| 1 |  | 1 | 10 |  | 10 | 10 | 0.5 | 5 | 5 |  | 10 | 20 | 50 | 5 | 20 | 20 |
| 4 | 1 | 1 | 10 | >20 |  | 20 | 0.5 | 10 | 10 | >20 |  | >20 | >20 | 10 | 20 | >100 |
| 7 | 5 | 2 | 20 | >20 |  | 20 | 0.5 | 10 | 10 | >20 |  | >20 | >20 | 10 | 20 | >100 |
| 8 | 1-2 | 1 | 10 |  | 20 | 20 | 0.5 | 10 | 10 |  | 20 | 100 | 50 | 5 | 10 | >100 |
| 10 | 0.5 | 1 | 5 |  | 2 | 5 | 1 | 10 | 2 |  | 20 | 20 | 5 | 5 | 5 | 2 |
| 11 |  | >10 | 10 |  | 2 | 5 | >10 | >10 | 2 |  | >10 | >10 | 2 | 10 | 10 | 10 |
| 13 | 2 | 1 | 10 | >20 |  | 10 | 1 | 20 | 5 | >20 |  | >20 | 5 | 5 | 10 | >50 |
| 14 | 2 | 2 | 20 | >20 |  | 5 | 1 | 10 | 1 | >20 |  | >20 | 5 | 5 | 10 | 10 |
| 16 | 1 | 1 | 10 | >20 |  | 10 | 1 | 20 | 5 | >20 |  | >20 | 5 | 5 | 10 | >100 |
| 17 | 1 | 2 | 10 |  | 2 | 5 | 2 | 10 | 5 |  | 20 | 50 | 5 | 10 | 10 | 10 |
| 18 | 1 | 2 | 10 |  | 5 | 5 | 2 | 10 | 5 |  | 20 | 20 | 5 | 5 | 5 | 50 |
| 20 | 50 | 5 | 10 |  | 5 | 2 | 2 | 10 | 5 |  | 20 | >50 | 10 | 0.5 | 5 | 20 |

NOTE.—C.p. = *Clostridium perfringens* ATCC 3626; S.a. = *Staphylococcus aureus* Tour; St.h. = *Streptococcus hemolyticus* C 203; St.f. = *Streptococcus faecalis* ATCC 10541; D.pn. = *Diplococcus pneumoniae* UC 41; P.v. = *Proteus vulgaris* X19 ATCC 881; E.c. = *Escherichia coli* SFK 12140 (synthetic medium); S.ty. = *Salmonella typhimurium* Kh; Sh.S. = *Shigella sonnei* ATCC 9290; K.p. = *Klebsiella pneumoniae* ATCC 10031; K.p.I. = *Klebsiella pneumoniae* ISM; Ps.a. = *Pseudomonas aeruginosa* ATCC 10145; C.a. = *Candida albicans* SKF 2270; T.m. = *Trichophyton mentagrophytes* SKF 17410; My.t. *Mycobacterium tuberculosis* 1137Rv ATCC 9360; T.v. *Trichomonas vaginalis*.

What is claimed is:

1. A compound corresponding to the formula

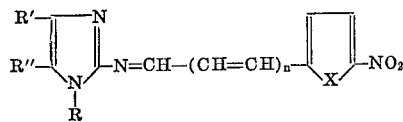

wherein R represents hydrogen, lower alkyl, lower hydroxyalkyl or lower halogenoalkyl; R' represents hydrogen or phenyl; R'' represents hydrogen, lower alkyl, lower hydroxyalkyl, lower halogenoalkyl or phenyl; X represents O or S; *n* is 0 or 1; and its mineral acid salts.

2. A compound as defined in claim 1 which is 2-(5-nitro-2-furfurylideneamino)-imidazole.

3. A compound as defined in claim 1 which is 1-methyl-2 - (5 - nitro - 2 - furfurylideneamino)-5-isopropylimidazole.

9. A compound as defined in claim 1 which is 1-(2-hydroxyethyl) - 2 - (5 - nitro - 2 - thenylideneamino)-5-ethylimidazole.

10. A compound as defined in claim 1 which is 1-(2-hydroxyethyl) - 2 - (5 - nitro - 2 - thenylideneamino)-5-(n-propyl)imidazole.

References Cited

Hetzheim, A., et al.: Chem. Ber. 100, pp. 3418–26 (1967).

MILDRED M. CROWDER, Primary Examiner

U.S. Cl. X.R.

424—273

UNITED STATES PATENT OFFICE
CERTIFICATE OF CORRECTION

Patent No. 3,746,705         Dated July 17, 1973

Inventor(s) Bruno Cavalleri and Giancarlo Lancini

It is certified that error appears in the above-identified patent and that said Letters Patent are hereby corrected as shown below:

Column 2, line 47, strike "nirto" and substitute --nitro--.

Column 3, line 27, strike " propylidene-" and substitute --propenylidene- --.

In second line of the Note in Table II, towards the end, strike "SFK" and substitute --SKF--.

Signed and sealed this 18th day of December 1973.

(SEAL)
Attest:

EDWARD M. FLETCHER, JR.
Attesting Officer

RENE D. TEGTMEYER
Acting Commissioner of Patents